United States Patent [19]

McClellan

[11] Patent Number: 5,647,621

[45] Date of Patent: Jul. 15, 1997

[54] BACKUP PROTECTION DEVICE

[76] Inventor: Gordon L. McClellan, 7026 Woodley La., Falls Church, Va. 22042

[21] Appl. No.: 599,374

[22] Filed: Feb. 9, 1996

[51] Int. Cl.$^6$ ...................................................... B60R 19/24
[52] U.S. Cl. .......................... 293/117; 224/521; 280/507; 296/26
[58] Field of Search ...................................... 293/117, 106, 293/155; 296/26; 280/507; 224/489, 490, 521

[56] References Cited

U.S. PATENT DOCUMENTS

| | | | |
|---|---|---|---|
| 4,950,010 | 8/1990 | Denny | 293/117 |
| 5,368,209 | 11/1994 | Hill | 224/521 X |

FOREIGN PATENT DOCUMENTS

| | | | |
|---|---|---|---|
| 491241 | 6/1992 | European Pat. Off. | 280/504 |
| 2235668 | 3/1991 | United Kingdom | 280/504 |

Primary Examiner—David M. Mitchell
Assistant Examiner—Kia M. Robinson
Attorney, Agent, or Firm—Marion P. Lelong

[57] ABSTRACT

When a van or a sport utility vehicle having a trailer hitch and a spare tire attached to the outside of its tailgate is backing up, collision with a solid object impacts the tire and crumples the tailgate, causing expensive repairs. The backup protection device of this invention is mounted on the trailer hitch and receives the impact, transmitting it to the vehicular frame and protecting the tailgate. This device comprises a transverse tube, a central tube that is longitudinally disposed and fits over the trailer hitch, and a pair of side tubes that are disposed in parallel to the central tube. The central and side tubes are rigidly and perpendicularly attached to the transverse tube. A backup plate that is vertically disposed in use and a step plate that is horizontally disposed in use may also be attached to the transverse tube.

8 Claims, 3 Drawing Sheets

BACKUP PROTECTION DEVICE

BACKGROUND OF THE INVENTION

1. Field of the Invention

This invention relates to land vehicles and particularly to vans and sport utility vehicles having tail gates. It especially relates to protective devices that are attached to the exterior of a vehicle to protect the vehicle body, and especially the tail gate, from damage while backing into solid objects.

2. Description of Related Art

Some van models and nearly all models of sport utility vehicles support a spare wheel and tire on the tail gate, outside of the vehicular body. This arrangement maximizes interior space. However, it often interferes with rear visibility. Whatever the reason may be, these vehicles are all too frequently damaged while backing up. The first warning received by the driver is a sickening sound of a bump and crumpling metal as the spare tire encounters a telephone pole, a fence, a side of a building, or another solid object and transfers the impact to the tailgate. Repairs thereof are quite expensive.

Many vans and nearly all sport utility vehicles are equipped with a trailer hitch that is generally factory installed. This hitch is disposed on the vehicle's center line below the bumper and comprises a transversely disposed cross beam that is attached to the vehicle frame.

U.S. Pat. No. 2,843,224 of Landman et al describes an impact absorber for motor vehicles during rear or head-on collisions. This impact absorber is secured to the chassis and comprises an I-beam having an opening intermediate its ends. A metal sleeve, containing a strong coiled spring surrounding a sturdy shaft, extends through the opening and has a brake member at its lower end. A plate is attached to the upper end of the shaft. When a collision occurs, the impact upon the plate urges the shaft against the coiled spring and the brake member against the ground, thereby tending to cause the colliding vehicle to come to a stop. This device, however, would not be effective for protecting a tailgate having a spare tire mounted thereupon.

There is clearly a need for a device that can absorb the impact of a backup collision and protect the exterior of a vehicle having its spare tire mounted on its tailgate.

SUMMARY OF THE INVENTION

It is an object of this invention to provide a device that can be mounted on the trailer hitch of a vehicle for absorbing the impact of a backup collision and transferring this impact to the frame of the vehicle.

It is a further object to provide a device that can be rapidly mounted on and removed from the trailer hitch of a vehicle having its spare tire mounted outside of its tailgate.

It is another object to provide a device that is attached to the trailer hitch of a van or a sports utility vehicle and can be used as a step for entering the rear of the van or vehicle.

It is an additional object to provide a device that is mounted on the trailer hitch of a sports utility vehicle so that it projects rearwardly of the spare tire mounted on the tailgate of the vehicle and is able to receive the impact of a backup collision, thereby protecting the tailgate from damage.

The device of this invention comprises a transverse tube, two side tubes, and a central tube. The transverse tube is longer than the central and side tubes. The central tube is longer than the side tubes. Each tube is preferably square in cross section and has a wall thickness of about ⅛ inch.

The central tube slides into the trailer hitch until it contacts the cross beam of the trailer hitch. A transversely disposed hole through the central tube is provided that is preferably about ¾ inch in diameter and, for most trailer hitch models, about five inches from the end of the tube. A bolt or a trailer hitch pin is inserted into this hole and through the trailer hitch for holding the backup protection device of this invention to the trailer hitch.

A side of the central tube at one end is rigidly and perpendicularly attached, as by welding, to the center of the transverse tube so that it is beneath the transverse tube when the device is attached to the trailer hitch of the vehicle. The two side tubes are also rigidly and perpendicularly attached, as by welding, at one end to the transverse tube, so that they straddle the central tube and are spaced therefrom but are higher than the central tube when the device is attached to the trailer hitch. The other end of each side tube contacts the cross beam of the trailer hitch, whereby the device is evenly supported and unable to swivel.

Preferably, a back up plate is also rigidly attached, as by welding, to the transverse plate and to the end of the central tube so that it is vertically disposed when the device is attached to the trailer hitch of the vehicle. Its principal function is cosmetic, but it does provide additional strength and rigidity.

As an additional preferable component, a step plate is rigidly attached, as by welding, to the two side tubes and to the transverse tube so that it is horizontally disposed when the device is attached to the trailer hitch of the vehicle. This step plate enables a person to be able to step more comfortably into the rear of the vehicle when the tailgate is swung open and to stand in a comfortable position when cleaning the top of the vehicle, for example.

DESCRIPTION OF THE PREFERRED EMBODIMENTS

Figure 1:
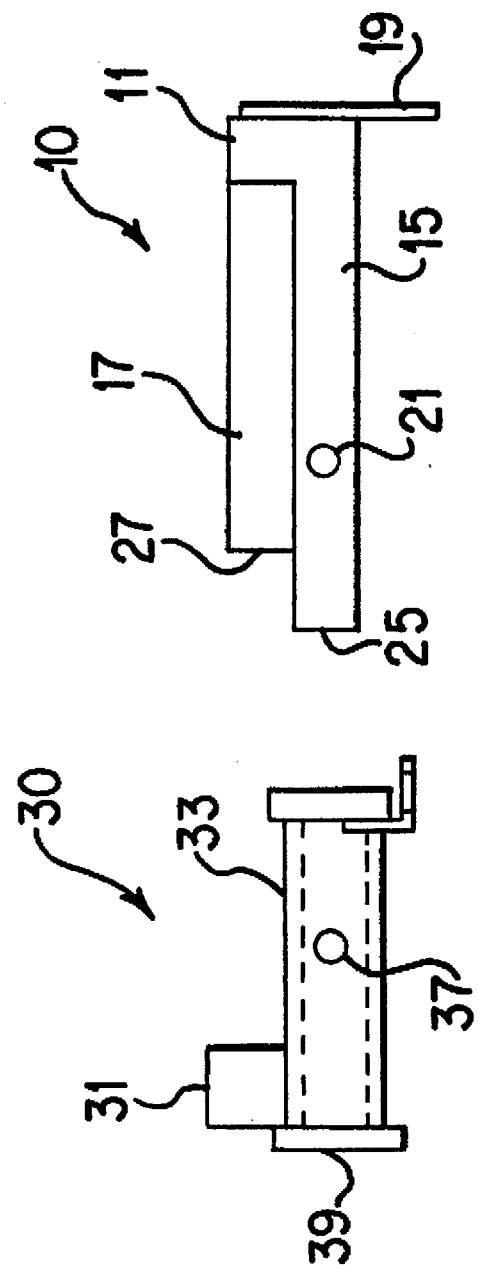
FIG. 1 is a side view of the backup protection device of this invention, without the step plate, as it is about to be inserted into the coupling of a trailer hitch.
Figure 3:
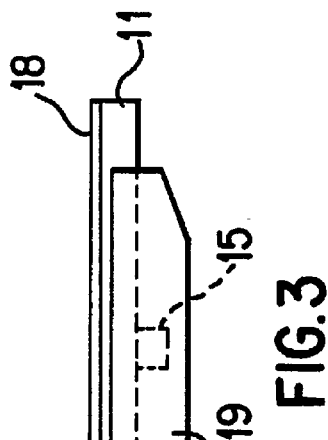
FIG. 3 is a rear view of the device, with both the step plate and the back plate.
Figure 4:
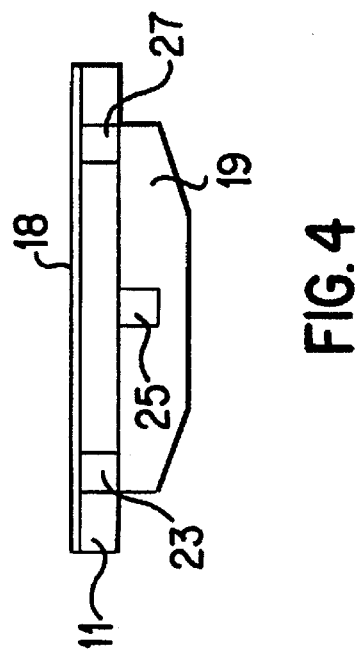
FIG. 4 is a front view of the device, with both the step plate and the back plate.
Figure 2:
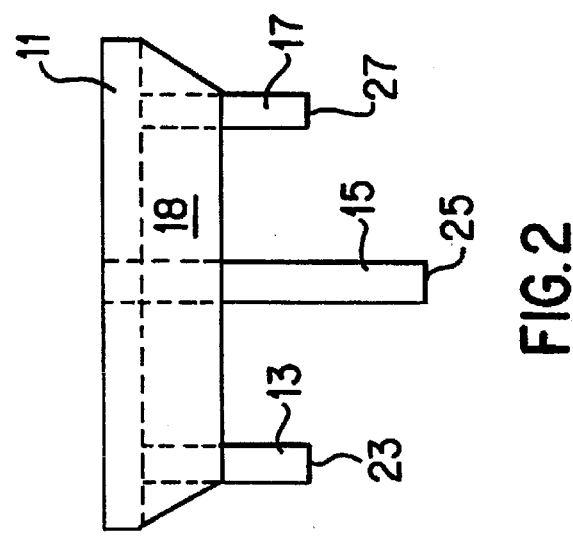
FIG. 2 is a top view of the device, without the back plate.
Figure 5:
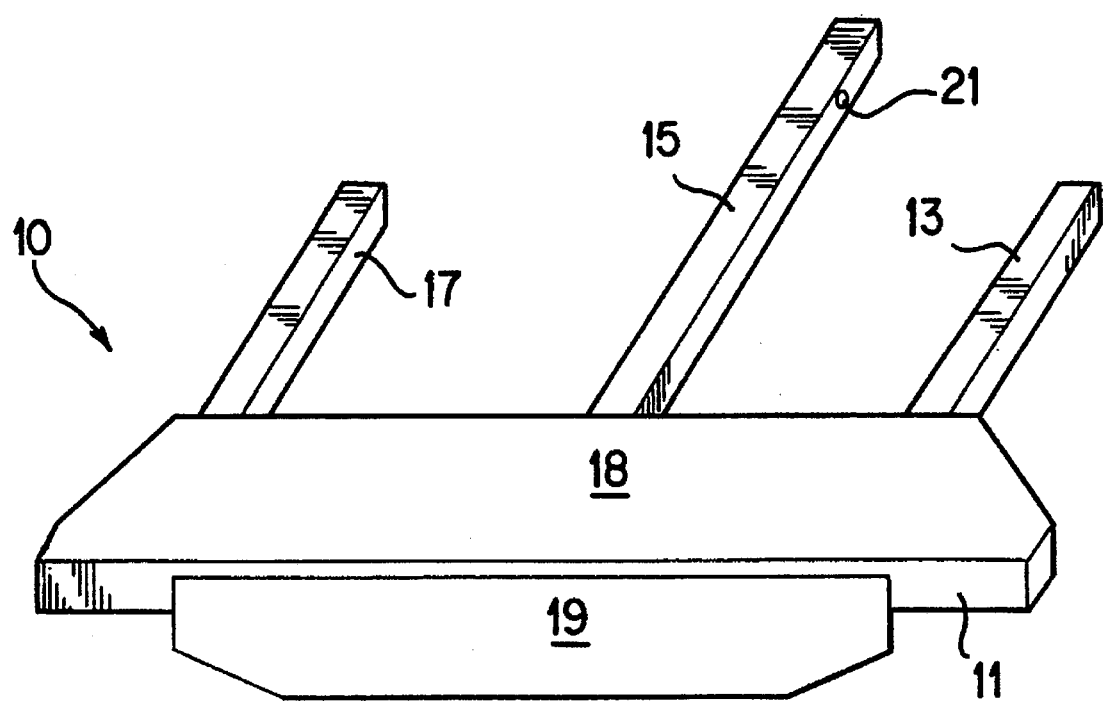
FIG. 5 is a rear isometric view of the device with both the step plate and the back plate.

As shown in FIGS. 1–5, back up protection device 10 comprises transverse tube 11, central tube 15, and a pair of side tubes 13 and 17, all square in cross section and made of either mild steel or stainless steel of ⅛-inch wall thickness. Central tube 15 is welded perpendicularly to the middle of transverse tube 11, side to side at one end of tube 15. Side tubes 13, 17 are welded perpendicularly at their ends to one side of transverse tube 11, this side being perpendicular to the side welded to tube 15. Tubes 13, 17 straddle tube 15 and are equally spaced therefrom.

Preferably, transverse tube 11 is 32 inches in length, central tube 15 is 18 inches in length, and side tubes 13 and 17 are each 13½ inches in length. The lengths of central tube 15 and of side tubes 13, 17, however, can be changed to ensure that transverse tube 11 extends a sufficient distance rearwardly of the vehicle to protect its spare tire.

All of the tubes are 2 inches by 2 inches in cross section. Hole 21, which is ¾ inch in diameter, is provided in central tube 15 at the exact distance required for end 25 to contact stop plate 39 of trailer hitch 30. For most trailer hitch models, such as the Resse hitch, this distance is about 5 inches from end 25 of central tube 15. Tubes 13, 17 are each suitably spaced about 5 inches from tube 15 and have exactly the length needed for ends 23, 27 to contact cross beam 31 of trailer hitch 30 so that device 10 is firmly supported and unable to swivel when a bolt or pin is inserted into holes 21, 37, after central tube 15 has been inserted into coupling 33 of trailer hitch 30 of a vehicle Additional utility is preferably provided by backup plate 19 of 12-gauge mild steel or stainless steel that is welded to transverse tube 11 and to the end of central tube 15. Plate 19 is suitably 16 inches in length and 6 inches in width, with bevelled corners. When device 10 is installed on trailer hitch 30, plate 19 is vertically disposed and covers the ends of tubes 13, 17.

Still more utility is preferably provided by step plate 18 of 12-gauge mild steel or stainless steel that is welded to side tubes 13, 17 and to transverse tube 11. Plate 18 is suitably 32 inches in length and 9 inches in width, with bevelled corners. When device 10 is installed on trailer hitch 30, plate 18 is horizontally disposed and covers the exposed upper sides of tubes 13, 17 and the upper side of tube 11.

It should be understood that many modifications and variations may be made of the embodiments hereinbefore described, but what should be construed as my personal property is defined in the following claims.

What is claimed is:

1. A backup protection device for vehicles having a trailer hitch, comprising a coupling having an attaching hole therethrough, a trailer hitch stop plate, and a trailer hitch cross beam, and a tailgate upon which a spare tire is mounted outside of said tailgate, said backup protection device comprising a transverse tube, a central tube that is rigidly and perpendicularly attached at one end and along one side to one side of and in the middle of said transverse tube, and a pair of side tubes that are rigidly and perpendicularly attached at one end thereof to a side of said transverse tube that is perpendicular to said side attached to said central tube and in spaced-apart and straddling relationship to said central tube, said central tube and said side tubes having exactly the lengths needed for simultaneously contacting said trailer hitch stop plate and said trailer hitch cross beam, respectively, and said central tube having a transversely disposed hole that is in exact alignment with said trailer hitch attaching hole, whereby, when said device is attached to said trailer hitch by inserting said central tube into said coupling and by inserting a trailer hitch pin into and through both said holes, said side tubes are higher than said central tube and other end of said central tube and said side tubes contact said trailer hitch cross beam so that said device is firmly supported and unable to swivel.

2. The backup protection device of claim 1, wherein said transverse tube is 32 inches in length and two inches by two inches in cross section.

3. The backup protection device of claim 2, wherein said central tube is 18 inches in length and said side tubes are 13½ inches in length.

4. The backup protection device of claim 2, wherein said central tube and said side tubes are two inches by two inches in cross section.

5. The backup protection device of claim 1, wherein a backup plate is rigidly attached to said transverse tube and to said one end of said central tube.

6. The backup protection device of claim 5, wherein said backup plate is 16 inches in length by 6 inches in width, with bevelled lower corners, and is vertically disposed when said device is attached to said trailer hitch.

7. The backup protection device of claim 1, wherein a step plate is rigidly attached to sides of said side tubes and of said transverse tube.

8. The backup protection device of claim 7, wherein said step plate is 32 inches in length and 9 inches in width, with bevelled front corners, and is horizontally disposed when said device is attached to said trailer hitch.

* * * * *